United States Patent
Ino et al.

(10) Patent No.: US 12,523,183 B2
(45) Date of Patent: Jan. 13, 2026

(54) ELECTRONIC THROTTLE CONTROL METHOD AND ELECTRONIC THROTTLE CONTROL DEVICE

(71) Applicant: Nikki Co., Ltd., Kanagawa-ken (JP)

(72) Inventors: Takuya Ino, Kanagawa-ken (JP); Ryuichi Oguro, Kanagawa-ken (JP)

(73) Assignee: NIKKI CO., LTD. (JP)

( * ) Notice: Subject to any disclaimer, the term of this patent is extended or adjusted under 35 U.S.C. 154(b) by 0 days.

(21) Appl. No.: 18/918,031

(22) Filed: Oct. 16, 2024

(65) Prior Publication Data

US 2025/0146447 A1  May 8, 2025

(51) Int. Cl.
*F02D 41/00* (2006.01)

(52) U.S. Cl.
CPC ....... *F02D 41/0002* (2013.01); *F02D 41/009* (2013.01); *F02D 2200/101* (2013.01)

(58) Field of Classification Search
CPC .............. F02D 41/0002; F02D 41/009; F02D 2200/101; F02D 2041/1409; F02D 2041/1422; F02D 2200/0404; F02D 2250/18; F02D 11/105; F02D 11/10; F02D 31/002; F02D 41/1477; F02D 2011/101
See application file for complete search history.

(56) References Cited

U.S. PATENT DOCUMENTS

| | | | |
|---|---|---|---|
| 5,151,861 A * | 9/1992 | Danno | B60K 28/16 180/197 |
| 5,508,923 A | 4/1996 | Ibamoto | |
| 6,779,509 B1 * | 8/2004 | Kondo | F02D 41/221 123/399 |
| 8,041,487 B2 * | 10/2011 | Worthing | F02D 41/1497 123/436 |
| 2022/0307429 A1 | 9/2022 | Sutoh | |
| 2023/0043206 A1 | 2/2023 | Narita | |

FOREIGN PATENT DOCUMENTS

| | | | | |
|---|---|---|---|---|
| EP | 3708813 A1 * | 9/2020 | | F02D 9/02 |
| JP | H05240073 A | 9/1993 | | |
| JP | 2008038872 A | 2/2008 | | |
| JP | 2022148583 A | 10/2022 | | |
| WO | 2020160846 A1 | 8/2020 | | |

OTHER PUBLICATIONS

Extended European Search Report, EP24204553.2, dated Apr. 3, 2025.

\* cited by examiner

*Primary Examiner* — Hung Q Nguyen
(74) *Attorney, Agent, or Firm* — Fishman Stewart PLLC

(57) ABSTRACT

An electronic throttle control method by which an electronic control unit (ECU) controls opening and closing of a throttle while providing a control signal on a basis of an input data signal may include calculating, via the ECU, i) an engine revolution speed deviation from a difference between an engine revolution speed and an engine revolution speed command, ii) an engine revolution acceleration on a basis of the engine revolution speed, iii) a proportional torque from a product of the engine revolution speed deviation and a proportional torque coefficient, and iv) an integral torque by multiplying an integral of a product of the engine revolution speed deviation and an integral torque coefficient by a forgetting coefficient. The method may further include providing, via the ECU, the control signal for the throttle using a sum of the proportional torque and the integral torque as a torque command value.

11 Claims, 3 Drawing Sheets

ELECTRONIC THROTTLE CONTROL METHOD AND ELECTRONIC THROTTLE CONTROL DEVICE

CROSS-REFERENCE TO RELATED APPLICATIONS

This application claims priority to Japanese Patent Application No. JP 2023-178887, filed on Oct. 17, 2023, the contents of which is hereby incorporated by reference in its entirety.

TECHNICAL FIELD

The present invention relates to a control method for opening and closing a throttle installed in the air intake system of an engine with an electronic control system, and an electronic throttle control device for implementing the control method.

BACKGROUND

To perform engine control with high accuracy for the purpose of reducing fuel consumption and enhancing traveling performance of a vehicle in conventional cases, an electronic throttle control device that opens and closes a throttle through an operation of an electronic control unit that is an electronic control means, instead of mechanically opening and closing a throttle installed in the air intake system of the engine through an accelerator operation performed by the driver, is disclosed in JP H05-240073 A and the like, for example.

Further, as for such an electronic throttle control device, JP 2008-038872 A discloses a control method for obtaining a revolution speed deviation by calculating a difference between a detected engine revolution speed and an engine revolution speed command (a target revolution speed), and driving an actuator of a throttle so as to realize a throttle operation that has been set beforehand as an appropriate value in accordance with the amount of the deviation. The applicant of the present application has also proposed, in JP 2022-148583 A, a control method for calculating a revolution speed deviation by calculating a difference between a detected engine revolution speed and an engine revolution speed command (a target revolution speed), and driving an actuator of a throttle so as to realize a throttle operation that has been set beforehand as an appropriate value in accordance with the amount of the deviation.

As a torque calculation portion in conventional throttle control, a torque calculation portion as illustrated in FIG. 4 is known. The configuration is as follows. An engine revolution speed deviation is calculated as a value obtained by subtracting, from a preset engine revolution speed command, an engine revolution speed calculated from a pulse period input from a crank pulse sensor, the product of the engine revolution speed deviation and a proportional torque coefficient is calculated as a proportional torque required for the engine, and the product of the engine revolution speed deviation and an integral torque coefficient is integrated to calculate an integral torque. The sum of the calculated proportional torque and integral torque is used as a torque command to request the engine.

In such a conventional control method, when a load is applied, and the revolution speed deviation is positive (when the engine revolution speed is lower than the engine revolution speed command), the product of the engine revolution speed deviation and the integral torque coefficient (an integral torque gain $K_i$) is integrated, and the integral torque is integrated in accordance with the engine revolution speed deviation, to continue to become larger in the positive direction, as shown in the mathematical expression shown below.

[Math. 1]

$$Torq_i = K_i \int \{(\omega_{ref} - \omega)\} dt$$

$Torq_i$: integral torque
$K_i$: integral torque gain
$\omega_{ref}$: engine revolution speed command
$\omega$: engine revolution speed In a case where such a control system performs control so that the engine revolution speed is kept constant when load application and load removal are performed as illustrated in FIG. 5, the integral torque rises to a torque necessary to match the engine revolution speed with the engine revolution speed command, when a load is applied, and the engine revolution speed deviation is positive (when the engine revolution speed is lower than the engine revolution speed command).

After that, when load removal is performed, it takes a long time for the integral torque to return to a steady state at a time of no load. Therefore, there is a problem in that the engine revolution speed excessively overshoots with respect to the engine revolution speed command, or takes a long time to converge to the revolution speed command.

SUMMARY

The present invention aims to enable control without excessive overshooting with respect to a revolution speed command at a time of revolution speed control, and enable quick convergence to the revolution speed command.

The present invention made to solve the above problems provides an electronic throttle control method by which an electronic control unit controls opening/closing of a throttle while generating a control signal on the basis of an input data signal. In this method, the electronic control unit calculates an engine revolution speed deviation from a difference between an engine revolution speed and an engine revolution speed command, calculates an engine revolution acceleration on the basis of the engine revolution speed, calculates a proportional torque from the product of the engine revolution speed deviation and a proportional torque coefficient, calculates an integral torque by multiplying the integral of the product of the engine revolution speed deviation and an integral torque coefficient by a forgetting coefficient; and generates a control signal for the throttle, using the sum of the proportional torque and the integral torque as a torque command value.

The present invention also provides an electronic throttle control device that includes: a throttle to which an actuator is attached; and an electronic control unit that controls opening and closing of the throttle via the actuator while generating a control signal on the basis of an input data signal. In the electronic throttle control device, the electronic control unit includes: a revolution speed deviation calculation unit that calculates an engine revolution speed deviation from a difference between an engine revolution speed and an engine revolution speed command; a revolution acceleration calculation unit that calculates an engine revolution acceleration on the basis of the engine revolution speed; a proportional torque calculation unit that calculates a proportional torque from the product of the engine revolution speed deviation and a proportional torque coefficient; and an integral torque calculation unit that calculates an integral torque by multiplying the integral of the product of the engine revolution speed deviation and an integral torque coefficient by a forgetting coefficient.

In the present invention, the forgetting coefficient is set to a value greater than 0 and smaller than 1, in a case where the engine revolution speed is higher than the engine revolution speed command, and the engine revolution acceleration is not lower than a set acceleration. In any other case, the forgetting coefficient is set to 1.

According to the present invention, an increase in the engine revolution speed at a time of removal of load is detected from the engine revolution speed and the engine revolution acceleration, and an integral torque is obtained by multiplication with the forgetting coefficient. Thus, it is possible to perform control without excessive overshooting, and make the engine revolution speed to quickly converge to the revolution speed command.

DETAILED DESCRIPTION

The following is a description of an embodiment of the present invention, with reference to the drawings.

Figure 1:
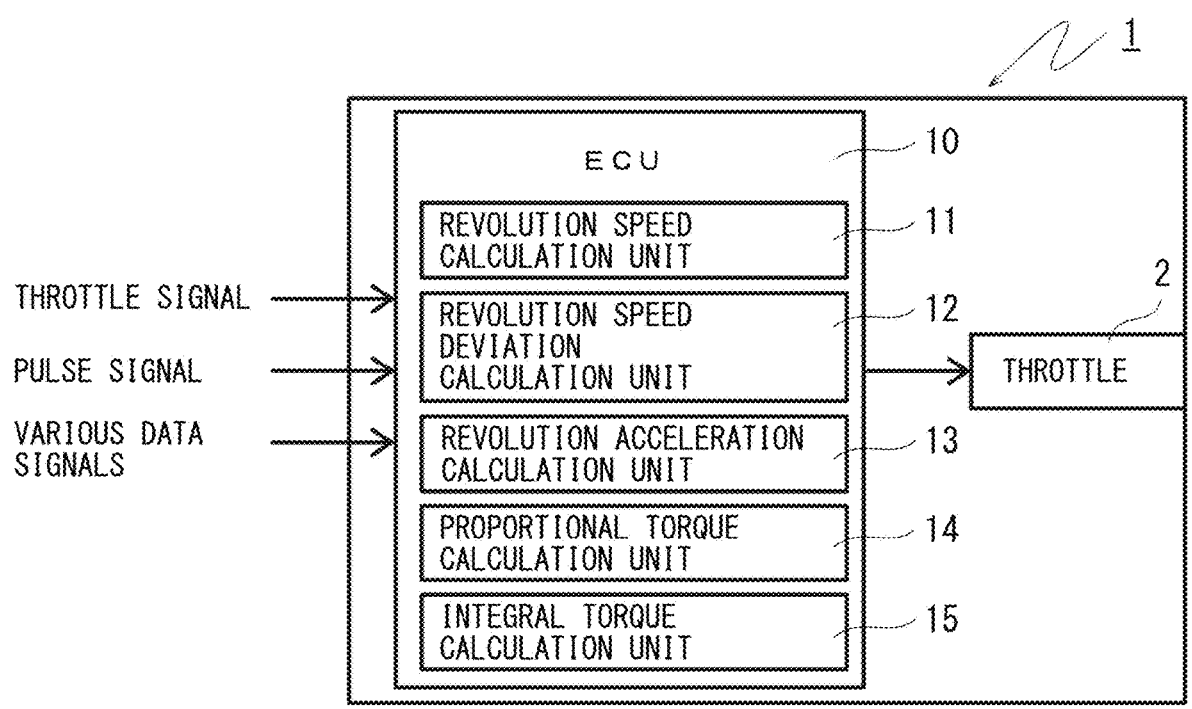
FIG. 1 is a simplified configuration diagram of an electronic throttle control device according to an embodiment of the present invention.

FIG. 1 is a configuration diagram in which an electronic throttle control device according to an embodiment of the present invention is simplified. As illustrated in this drawing, an electronic throttle control device 1 includes a throttle 20 to which an actuator (not illustrated) is attached, and an electronic control unit (ECU) 10 that is an electronic control means that controls opening/closing of the throttle 20. The electronic control unit 10 automatically controls opening/closing of the throttle 20 while generating a control signal by a predetermined calculation method on the basis of various data signals input thereto.

Further, the electronic control unit 10 includes means functionally formed with software stored in a storage means (not illustrated), which are: a revolution speed calculation unit 11 that calculates an engine revolution speed; a revolution speed deviation calculation unit 12 that calculates an engine revolution speed deviation; a revolution acceleration calculation unit 13 that calculates an engine revolution acceleration; a proportional torque calculation unit 14 that calculates a proportional torque; and an integral torque calculation unit 15 that calculates an integral torque.

Figure 2:
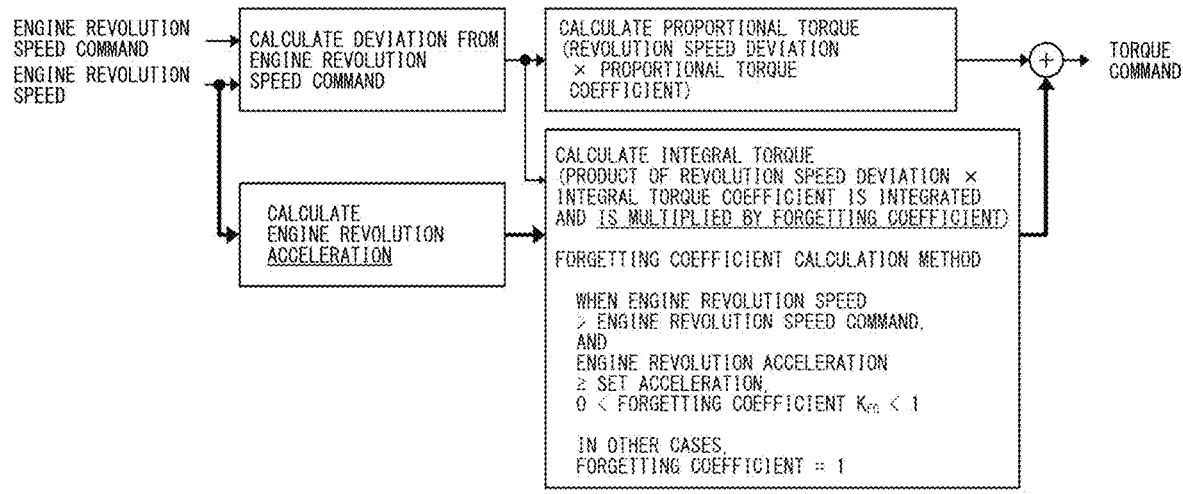
FIG. 2 is a functional block diagram illustrating details of control to be performed by the electronic throttle control device according to the embodiment illustrated in FIG. 1.
Figure 3:
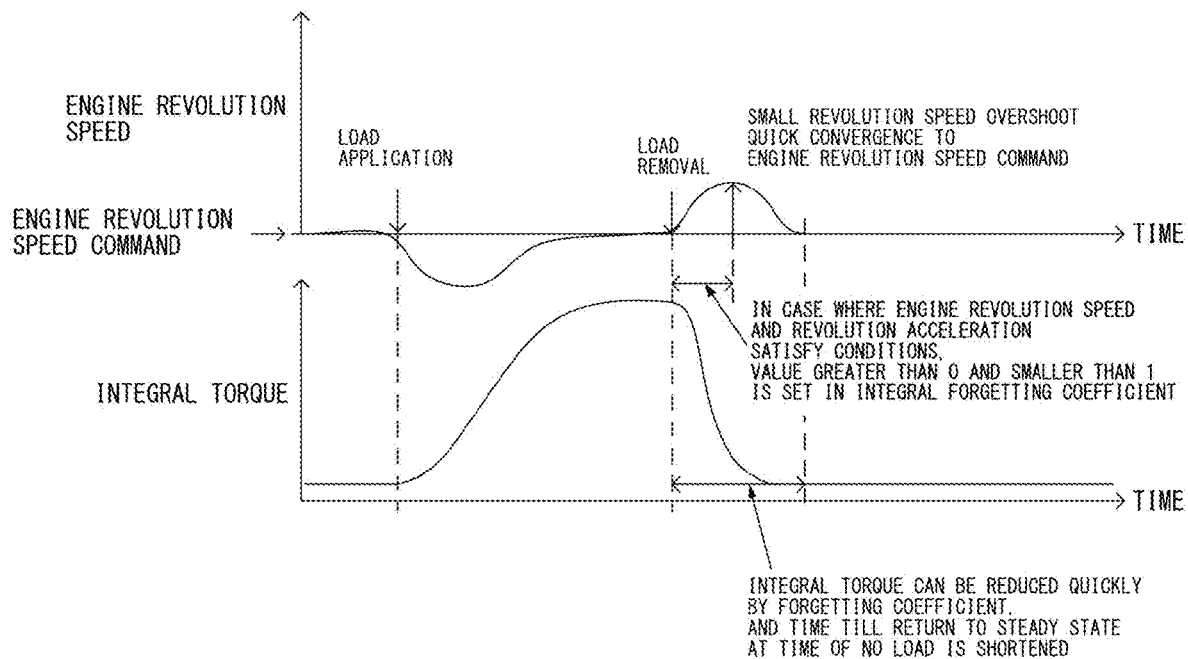
FIG. 3 is a graph illustrating changes in integral torque in a case where load application and load removal are performed when an engine revolution speed is controlled to match an engine revolution speed command in an example of the control to be performed by the electronic throttle control device illustrated in FIG. 1.
Figure 4:
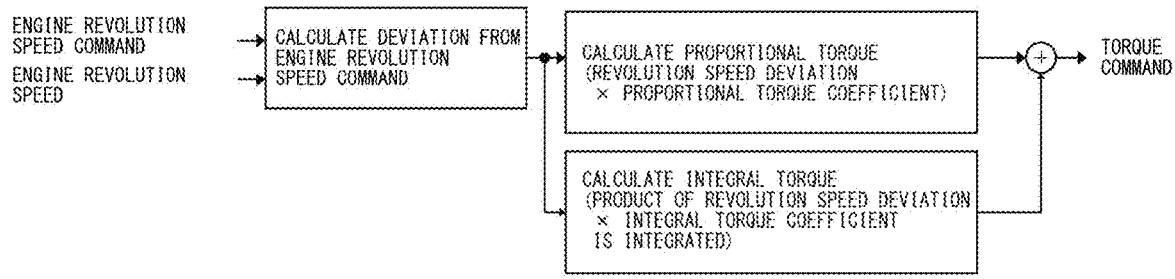
FIG. 4 is a functional block diagram illustrating details of control to be performed by a conventional electronic throttle control device.
Figure 5:
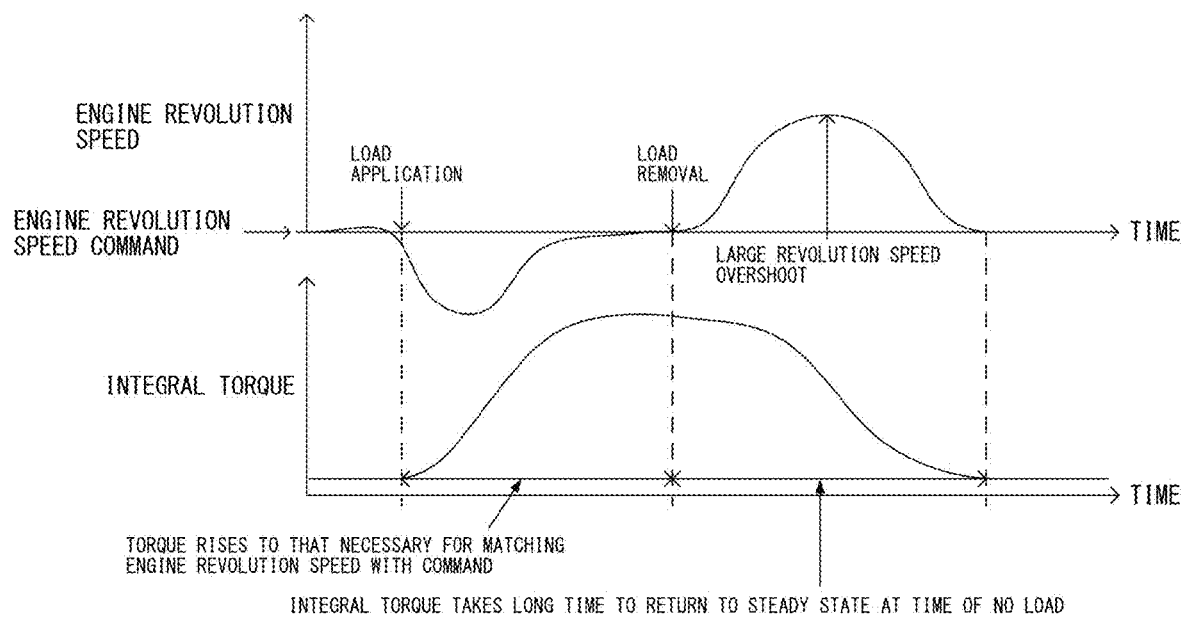
FIG. 5 is a graph illustrating changes in integral torque in a case where load application and load removal are performed when an engine revolution speed is controlled to match an engine revolution speed command in an example of the control to be performed by the conventional electronic throttle control device.

Referring next to a functional block diagram in FIG. 2 and a graph in FIG. 3, the control to be performed by the electronic control unit 10 is described in detail.

First, in the present embodiment, the revolution speed calculation unit 11 calculates an engine revolution speed from a cycle of a pulse signal that is input from a crank pulse sensor (not illustrated), the revolution speed deviation calculation unit 12 calculates an engine revolution speed deviation from a difference between the engine revolution speed and an issued engine revolution speed command (a target revolution speed), and the revolution acceleration calculation unit 13 calculates an engine revolution acceleration on the basis of the engine revolution speed.

The proportional torque calculation unit 14 and the integral torque calculation unit 15 calculate a proportional torque and an integral torque, to generate a control signal for the throttle 20, using the sum of the proportional torque and the integral torque as the value of a torque command. In the calculation of the integral torque shown below in a mathematical expression (1), a forgetting coefficient is used in addition to an integral torque coefficient (an integral torque gain $K_i$), which is a feature of the present invention.

[Math. 2]

$$Torq_i = K_i \int \{(\omega_{ref} - \omega)\} dt \times K_{FG} \qquad (1)$$

$Torq_i$: integral torque $K_i$: integral torque gain $\omega_{ref}$: engine revolution speed command $\omega$: engine revolution speed $K_{FG}$: forgetting coefficient The forgetting coefficient $K_{FG}$ is obtained under the following conditions A and B.

Condition A: In a case where the engine revolution speed is higher than the engine revolution speed command, and the engine revolution acceleration is equal to or higher than a set acceleration, the forgetting coefficient $K_{FG}$ is set to a value greater than 0 and smaller than 1.

Condition B: In any other case, the forgetting coefficient $K_{FG}$ is set to 1.

As described above, in a case where the engine revolution speed is higher than the engine revolution speed command, and the engine revolution acceleration is equal to or higher than the set acceleration, which is when the engine is accelerating, the forgetting coefficient is set to a value greater than 0 and smaller than 1.

With this arrangement, when the control for matching the engine revolution speed with the engine revolution speed command is performed, an increase in the engine revolution speed due to removal of load is detected, and the forgetting coefficient $K_{FG}$ is set to a value greater than 0 and smaller than 1. Thus, the time in which the integral torque returns from the value at the time of load application to a no-load state is shortened, the amount of overshooting of the engine revolution speed with respect to the engine revolution speed command is reduced, and the time of convergence of the engine revolution speed to the engine revolution speed command is also shortened.

As described above, according to the present invention, an increase in the engine revolution speed at a time of removal of load is detected from the engine revolution speed and the engine revolution acceleration, and an integral torque is obtained by multiplication with the forgetting coefficient. Thus, it is possible to perform control without excessive overshooting, and make the engine revolution speed to quickly converge to the engine revolution speed command.

What is claimed is:

1. An electronic throttle control method by which an electronic control unit controls opening and closing of a throttle while providing a control signal on a basis of an input data signal, the method comprising:
   via the electronic control unit;
      calculating an engine revolution speed deviation from a difference between an engine revolution speed and an engine revolution speed command;
      calculating an engine revolution acceleration on a basis of the engine revolution speed;
      calculating a proportional torque from a product of the engine revolution speed deviation and a proportional torque coefficient;
      calculating an integral torque by multiplying an integral of a product of the engine revolution speed deviation and an integral torque coefficient by a forgetting coefficient; and
      providing the control signal for the throttle using a sum of the proportional torque and the integral torque as a torque command value.

2. The electronic throttle control method according to claim 1, wherein:
   the forgetting coefficient is set to a value greater than 0 and smaller than 1, when the engine revolution speed is higher than the engine revolution speed command, and the engine revolution acceleration is not lower than a set acceleration; and
   the forgetting coefficient is set to 1 in any other case.

3. An electronic throttle control device, comprising:
   a throttle to which an actuator is attached; and
   an electronic control unit that controls opening and closing of the throttle via the actuator while providing a control signal on a basis of an input data signal, wherein:
   the electronic control unit includes:
      a revolution speed deviation calculation unit configured to calculate an engine revolution speed deviation from a difference between an engine revolution speed and an engine revolution speed command;
      a revolution acceleration calculation unit configured to calculate an engine revolution acceleration on a basis of the engine revolution speed;
      a proportional torque calculation unit configured to calculate a proportional torque from a product of the engine revolution speed deviation and a proportional torque coefficient; and
      an integral torque calculation unit configured to calculate an integral torque via multiplying an integral of a product of the engine revolution speed deviation and an integral torque coefficient by a forgetting coefficient.

4. The electronic throttle control device according to claim 3, wherein:
   the forgetting coefficient is set to a value greater than 0 and smaller than 1, when the engine revolution speed is higher than the engine revolution speed command, and the engine revolution acceleration is not lower than a set acceleration; and
   the forgetting coefficient is set to 1 in any other case.

5. A method of controlling opening and closing of a throttle, comprising:
   receiving at least one data signal with an electronic control unit;
   calculating, via the electronic control unit:
      an engine revolution speed deviation from a difference between an engine revolution speed and an engine revolution speed command;
      an engine revolution acceleration on a basis of the engine revolution speed;
      a proportional torque from a product of the engine revolution speed deviation and a proportional torque coefficient; and
      an integral torque by multiplying an integral of a product of the engine revolution speed deviation and an integral torque coefficient by a forgetting coefficient; and
   providing, via the electronic control unit, a control signal for the throttle using a sum of the proportional torque and the integral torque as a torque command value.

6. The method according to claim 5, wherein the at least one data signal includes a signal provided by a sensor.

7. The method according to claim 6, wherein the signal is a pulse signal and the sensor is a crank pulse sensor.

8. The method according to claim 7, further comprising calculating, via the electronic control unit, the engine revolution speed from a cycle of the pulse signal provided by the crank pulse sensor.

9. The method according to claim 5, further comprising setting the forgetting coefficient based on whether a condition is met.

10. The method according to claim 9, wherein setting the forgetting coefficient includes:
    setting the forgetting coefficient to a value greater than 0 and smaller than 1 when the condition is met; and
    setting the forgetting coefficient to a value of 1 when the condition is not met.

11. The method according to claim 10, wherein the condition is met when:
    the engine revolution speed is higher than the engine revolution speed command; and
    the engine revolution acceleration is equal to or higher than a set acceleration.

* * * * *